H. H. CUMMINGS.
AUTOMATIC DISTANCE INDICATOR FOR SHIPS.
APPLICATION FILED MAR. 3, 1913.
1,247,508.
Patented Nov. 20, 1917.
2 SHEETS—SHEET 1.
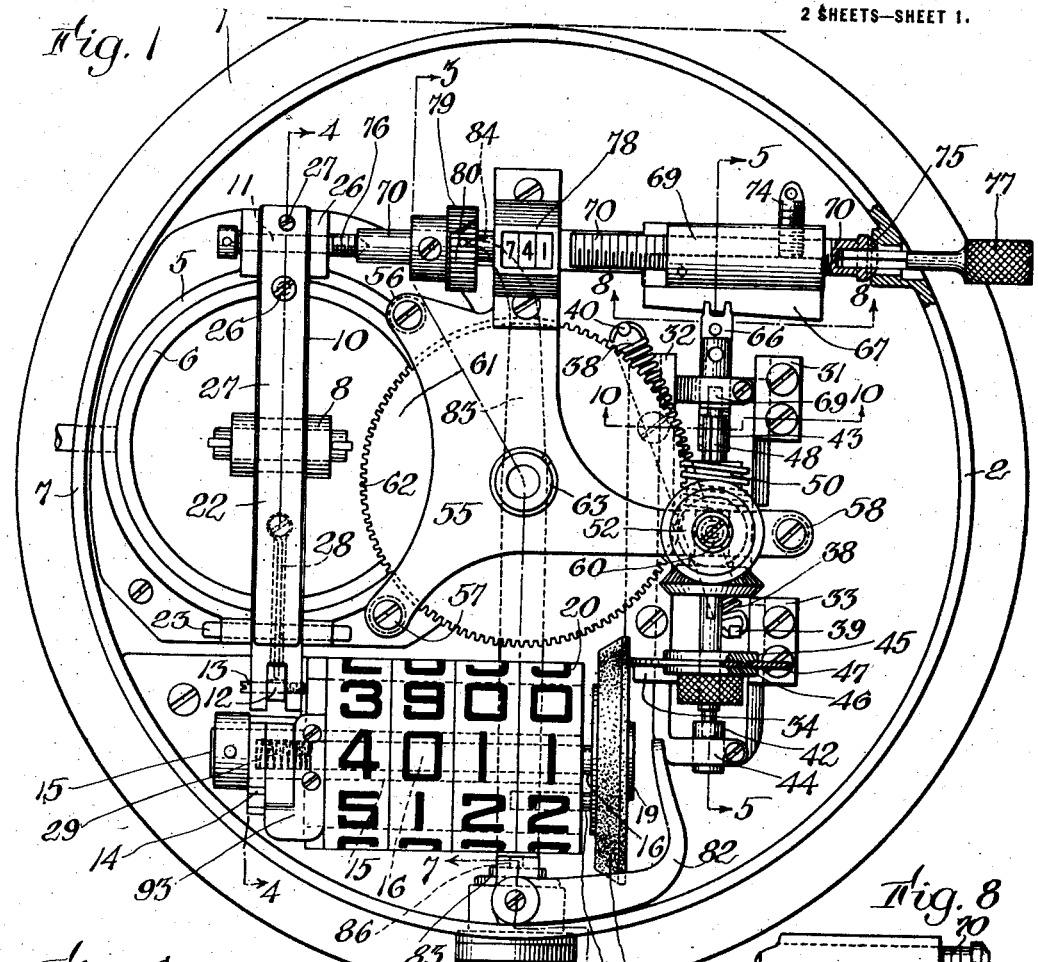
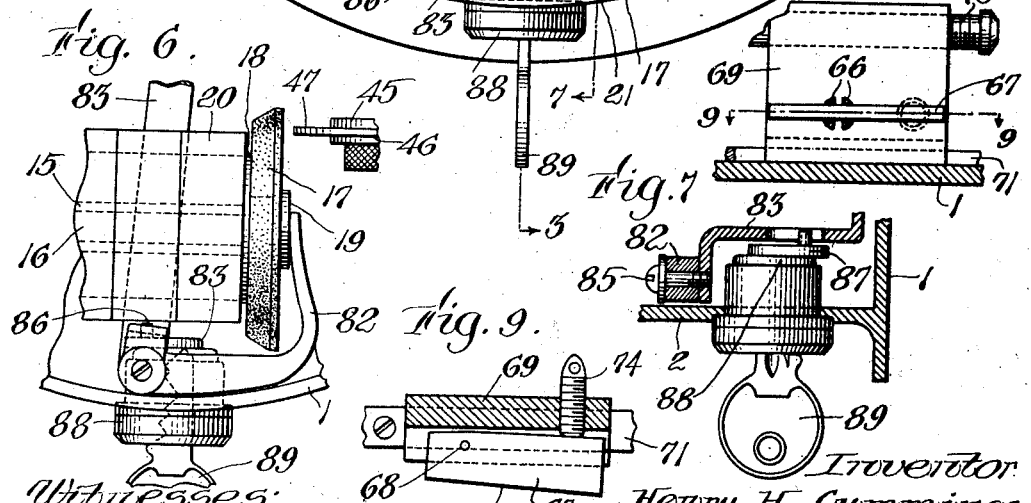
Witnesses:
Edward Maxwell
James R. Hodder
Inventor
Henry H. Cummings,
by Geo. H. Maxwell,
Attorney.

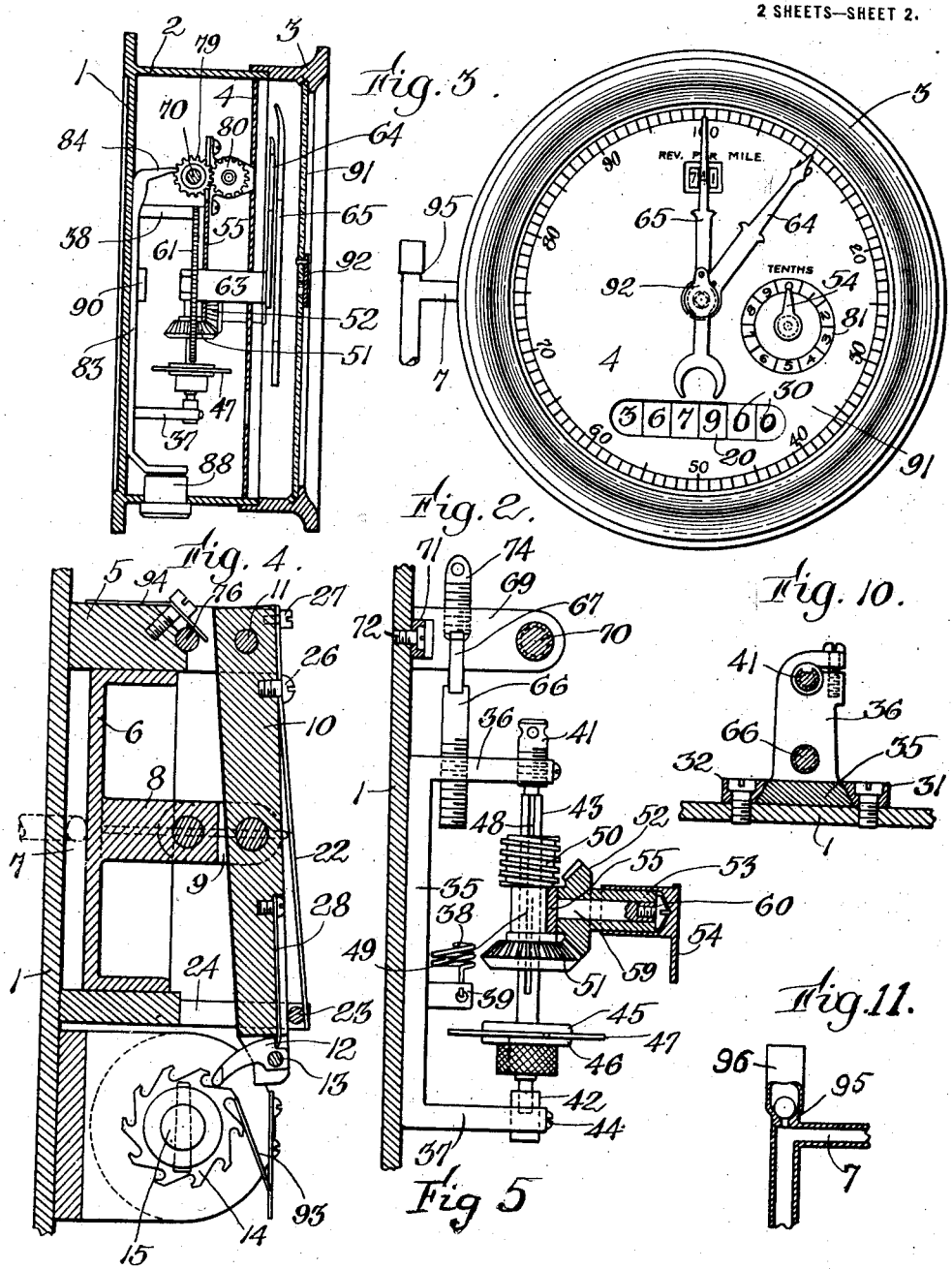
H. H. CUMMINGS.
AUTOMATIC DISTANCE INDICATOR FOR SHIPS.
APPLICATION FILED MAR. 3, 1913.
1,247,508.
Patented Nov. 20, 1917.
2 SHEETS—SHEET 2.
Witnesses:
Edward Maxwell
James R. Hodder
Inventor:
Henry H. Cummings,
by Geo. H. Maxwell,
Attorney.

UNITED STATES PATENT OFFICE.

HENRY H. CUMMINGS, OF BOSTON, MASSACHUSETTS.

AUTOMATIC DISTANCE-INDICATOR FOR SHIPS.

1,247,508.  Specification of Letters Patent.  Patented Nov. 20, 1917.

Application filed March 3, 1913. Serial No. 751,806.

*To all whom it may concern:*

Be it known that I, HENRY H. CUMMINGS, a citizen of the United States, and resident of Boston, county of Suffolk, State of Massachusetts, have invented an Improvement in Automatic Distance-Indicators for Ships, of which the following description, in connection with the accompanying drawings, is a specification, like letters on the drawings representing like parts.

This invention relates to indicating means to determine the distance traveled by a ship, automatically, through the actuation of the ship's engines or propelling shafts.

In navigating vessels propelled by power, especially large steamers, such as the warships of a navy, as well as the fast ocean traveling passenger ships, it has long been desirable to enable the navigating officer on the bridge or in the chart-room of the ship, to have some indicating means which will show instantly and automatically the distance traveled by the ship. Any indicating mechanism or device which depends upon the resistance of the water as the vessel is propelled therethrough, is unsatisfactory, because such water propelled devices are subject to many inaccuracies, exterior travel affecting conditions which are rarely alike at different times, and are thrown out by all kinds of disturbances in the water along the side, such as "slippage", frictional eddies, and the like. Such prior devices depending upon taking the speed of the vessel through some revolving or pressure member dependent upon the movement of the ship through the water, were no more effective than the old style of taffrail log. The old taffrail log, depending upon a revolving member trailed astern has been found to be entirely unsuited and inaccurate in practical use for indicating distance, and the most reliable means of determining distance traveled is from calculations based on the propelling power of the vessel. Every ship of war, for example, as soon as commissioned, is given numerous trial trips over measured miles, etc., to provide data showing how far the ship will be driven, the rates of speed, slip of the propelling screws, etc., at different revolutions per minute of the propelling screws. From such standardization trials, the navigating officer has a great mass of available data. For example, he will know that with the engines of his particular ship turning five hundred revolutions per minute, and with a given displacement, draft, and trim, his ship will make a certain distance through the water from which he can more accurately determine the distance traveled than by a taffrail log, or any other similar known means. Heretofore it has been customary for the navigating officer to secure from the engine room, the number of revolutions per minute of the propelling shafts, and then by manual calculations to secure the average of the several propelling shafts, and then to again calculate manually the distance which the ship is presumed to have traveled.

An important object of my present invention is to eliminate the necessity of all such calculations, and to provide an indicating means which will automatically register the distance traveled by actuating mechanism connected directly with the propelling engines of the ship, and which will show continually the actual mileage being traveled at any given number of revolutions per minute of the propelling shafts, preferably at the average revolutions per minute of all the propelling shafts of the ship. I also provide adjustable means coöperating with the indicating mechanism registering the number of revolutions per minute of the engines, to actuate the indicator showing the distance traveled at a properly proportioned speed for any given number of revolutions per minute of the engines. These indicating devices are constructed and arranged to be actuated directly from the propelling shafts so that they will register positively, accurately, and automatically in a remote part of the ship, and at several different places if desired, viz., the chart-room, the bridge and the conning tower. For example, if the navigating officer, from data previously obtained on trial trips, knows that with the ship in present trim and with her three propelling shafts turning at a given average speed per minute, that 741 revolutions will drive the ship 1 mile through the water, he will order the engineer to drive the propelling shafts at the given speed above mentioned, and then he may set my automatic distance indicator at 741 revolutions per mile and thereupon the indicator will register the exact number of revolutions of the propelling shaft and the exact number of miles traveled, so long as the given speed is maintained, and automatically indicating the distance traveled.

In order to insure the accuracy of the operation of my indicator, I preferably provide means whereby the mechanism is automatically locked in position when set for a given rate. Such locking means may be conveniently operated by a key carried by the navigating officer.

My present distance indicator is an improvement upon the type of automatic indicating device illustrated in my co-pending application, Serial No. 531,539 filed December 6, 1909, in which I have described and claimed, broadly, this type of apparatus, whereby the propelling engine of a ship is utilized as the means to determine automatically the distance traveled through the water. Furthermore, my present apparatus may be conveniently employed in connection with an average rotation counter or indicator shown and described in my co-pending application Serial No. 717,453, filed August 28, 1912, wherein I provide mechanism to secure automatically the average number of revolutions of a plurality of shafts, such as the two, three, or four propelling shafts of a vessel. Such average is automatically produced irrespective of the individual speed or direction of rotation of the various individual shafts, and whether one or more of said shafts is at rest, reversing, or continually varying in its rotative speed.

Other features of the invention, details of construction, and novel combinations of parts, will be hereinafter more distinctly pointed out and claimed.

Referring to the drawings, showing a preferred embodiment of my invention,

Figure 1 is a plan view of my present indicator;

Fig. 2 is a view on a reduced scale of the dial;

Fig. 3 is a vertical side view, partly in cross section of the dial and mechanism as shown in Fig. 2;

Fig. 4 is a view partly in cross section on the line 4—4 of Fig. 1;

Fig. 5 is a view also partly in cross section on the line 5—5 of Fig. 1;

Fig. 6 is a detail view of the driving connection between the revolution counter and the distance indicator;

Fig. 7 is a view on the line 7—7 of Fig. 1;

Fig. 8 is a view on the line 8—8 of Fig. 1;

Fig. 9 is a view in cross section on the line 9—9 of Fig. 8; and

Fig. 10 is a view on the line 10—10 of Fig. 1, each of said views where indicated being in the direction of the arrows on Fig. 1.

Fig. 11 is a detailed view of the release valve and signal.

My indicator may be operatively connected in any suitable or convenient manner with the propelling engines or shafts of a ship, but I preferably employ the same in connection with an average rotation counter of the kind illustrated in my said copending application Serial No. 717,453, which average counter is itself operatively connected with the propelling engines, and by connecting my present indicator with the shaft on which the average indicator for the plurality of ship's engines is shown, it can actuate the present indicating mechanism from the average counter shaft.

In the preferred form of my invention, I provide means to actuate the mechanism which is capable of operation through a long distance, i. e. from the engine room where an average rotation counter would be positioned, to the chart-room and bridge, where the present indicating apparatus would be positioned, and I find that by means of a suitable pneumatic connection such actuation can be very satisfactorily transmitted. In the modern naval war vessels, for example, the condensing mechanism provides a high vacuum, and I propose to use this pneumatic means to automatically transmit the number of revolutions from said counter to my indicator. If desired such transmissions of power or impulse may be reduced in number 1 for each 100 revolutions of the average counter, and as this is a convenient method of operation I purpose to use the same in the present apparatus.

My improved indicator comprises a case having a back 1, a cylindrical upstanding side 2, and a cover 3, threaded thereon, a dial 4 being fitted in the usual manner. Secured to the back 1 is a suction piston comprising an open cylinder 5, a movable piston 6 therein arranged to be reciprocated through the pneumatic connection with the condensing apparatus by a pipe 7. The piston 6 is provided with a standard 8 to which is pivoted a link 9, also pivoted to a lever 10. This lever is pivotally secured at one end by a pin 11 mounted in a forked extension of the rim 5 (see Fig. 4) and having its other end forked and carrying a pawl 12 loosely mounted on a stud 13. This pawl 12 is in position to actuate a star wheel 14 carried on a shaft 15, which is the prime mover of a rotation counter of usual type. As just explained, the actuation or transmission of power through the pneumatic pipe 7 to the suction piston 6 is intended to be controlled by the propelling engines through the actuation of an average counter and preferably such actuation will be constant for every 100 revolutions of the average counter. Therefore the suction piston 6 will reciprocate within its open cylinder 5 once for every 100 revolutions of the rotation counter in the engine room. The reciprocation of the suction piston 6 depresses the lever 10, rocking it upon its pivot 11, and actuating the star wheel 14 for a distance equal to one-tenth of a revolution or one tooth of said wheel. The star wheel 14 carries ten teeth, and each corresponds to the numbers 1–10 on the first indicating wheel of the rotation counter, as will be readily understood. The shaft 15 is preferably in the form of a sleeve and is adapted to carry a shaft 16, rotatively connected thereto, but permitted to slide longitudinally thereof, on which an emery wheel 17 is clamped between collars 18 and 19 as shown in Fig. 6. The first counter wheel 20 is operatively connected to the clamp 18 by means of a short stud 21 and hence to the shaft 15 carrying the star wheel 14. Reciprocation of the suction piston 6 serves to rotate the star wheel 14 a distance afforded by one tooth thereon and move the first counter wheel 20 a similar distance. The suction piston 6 is returned to normal position by the action of a spring 22 bearing upon a pin 23 carried in a forked extension 24 of the cylinder 5, said spring being secured to the lever 10 at 26 and 27, as shown in Fig. 4. A leaf spring 28 is also provided to maintain the pawl 12 in engagement with the teeth of the star wheel 14. An expansible spring 29 is provided in the socket of the shaft 15 and normally acting to force the shaft 16 and the emery wheel 17 carried thereby outwardly as shown in Fig. 1, but permitting said shaft and wheel to be moved in the reverse direction, as shown in Fig. 6. As the actuation of the suction piston 6 is intended to be constant for every 100 revolutions of the propelling engines, I have, for the sake of convenience, shown on the dial 4 the two blank indicating spaces 30 so that movement of the first rotative wheel 20 will show the number of hundreds of revolutions of the engine shafts and the remaining counter wheels will show the correspondingly increased number of revolutions, no counter wheels for the tens and units being required. Thus the number of revolutions which the engines are actually producing are automatically indicated and can be noted at any time by the navigating officer. This is important as if the navigator should order 800 revolutions per minute he could determine at a glance whether the order was being complied with and whether or not the 800 revolutions per minute were being produced by noting the indications of this counter mechanism.

Connected to the wheel 17 of this counter mechanism, I provide mechanism which will automatically indicate, from the rotations of the wheel 17 the distance in miles which the ship is traveling through the water, at any given number of revolutions per minute of her propelling shafts, which mechanism will now be described. Secured to the back 1 by an upper pair of dove-tailed lugs 31, 32, and a lower pair 33, 34, is a slide 35 having upright standards 36 and 37 at either end, as shown in Fig. 5. A spring 38 secured to a lug 39 on the slide 35 and with its other end attached to a pin 40 on the back 1 acts to maintain said slide 35 normally in an uppermost direction. The standards 36 and 37 are provided with bearings 41 and 42, which support a shaft 43 between them. The member 41 is preferably threaded through the standard 36 to provide a convenient means of adjustment and the lower bearing member 42 may also be adjusted with relation to its supporting standard 37 by means of the set screw 44, as shown in Fig. 2. Secured to the shaft 43 by means of clamping collars 45 and 46 is a disk 47 arranged on said shaft with its periphery to contact with the outer face of the emery or friction wheel 17. The spring 29 normally forces the shaft 16 and said wheel 17 outwardly so that the contact between the disk 47 and the emery wheel is of sufficient tension to insure the rotation of the disk 47 by its frictional engagement on the wheel 17. I have found that by making the wheel 17 of emery, I am enabled to secure a very efficient wearing surface, as well as a highly satisfactory frictional contact, permitting the light and easily balanced mileage mechanism to be accurately actuated. The shaft 43 has a long spline 48 and carries a hub 49 which is rotatively actuated by said spline, while permitting the shaft 43 to be moved longitudinally with relation thereto when the slide 35 is given a longitudinal movement. The hub 49 carries a worm gear 50 and a beveled gear wheel 51, as shown in Fig. 5. Arranged to mesh with the beveled gear 51 is a correspondingly beveled gear 52 of equal diameter and having a hub 53 which carries the indicating hand 54. It will be understood that each rotation of the wheel 17 imparts a greater or less degree of rotation to the disk 47 and the shaft 43, dependent on nearness to or distance from the center of the friction wheel 17.

As shown in Fig. 1, I provide a spider 55 suitably supported at 56, 57, and 58 on standards secured to the back 1 and providing bearings for the beveled gear 52, comprising a standard 59 on which a cap 60 is threaded to overlap the end of the hub 53 and retain the wheel 52 in position. The arm of the spider 55 extending to the support 58 is formed of appropriate width to fit over the hub 49 and between shoulders formed by the worm 50 and the beveled gear 51, as clearly indicated at Fig. 2, to retain the hub 49 in the same position during the longitudinal movement of the shaft 43 and slide 45. A gear 61 carried by the spider 55 is provided with gear teeth 62 in mesh with the thread of the worm 50, and is so proportioned that 100 revolutions of the shaft 43 and worm 50 will be required to rotate the wheel 61 through a complete revolution. This wheel is supported by its axle (not shown) in the sleeve 63, carried by the spider 55, which axle extends through and beyond the dial 4 and carries an indicating hand 64. This axle is preferably formed hollow and may receive in frictional engagement therewith a stud supporting a second indicator 65, so that said second indicator may be easily turned by hand relatively with the stem 63, or by a key fitted therein from outside.

In order to adjust the slide 35 longitudinally and to thereby adjust the disk 47 radially of the face of the friction wheel 17, I provide a member 66 threaded through the upper standard of the slide 35 and adapted to bear against a wedge member 67. The wedge 67 is pivotally mounted at 68 in a slot in the carrier 69 (see Figs. 1 and 9), which member has one portion in threaded engagement with a rod 70 and another portion guided on a trackway 71 secured to the back 1 by suitable screws 72. Preferably this wedge member 67 is so pivoted in the slot of the carrier as to allow for a slight rocking action to vary the inclination of the wedge surface 73 which is in contact with the adjustable member 66. An adjusting screw 74 is provided to effect such adjustment of the wedge member 67 by being threaded through a suitably tapped socket in the carrier 69 and bearing upon the inner edge of the wedge 67, as illustrated in Fig. 9. Manipulation of the screw 74 serves to rock the member 67 on its pivot 68 until the desired inclination of the wedge 73 is obtained. The shaft 70 is supported between a bearing 75 formed on the side 2 and an adjustable screw threaded member 76 at the other end. A thumb key 77 extends outside the ring 2 and when needed is inserted in the shaft 70 and forms a convenient means for rotating it and thereby moves the wedge member 67 transversely of the member 66, tending to force the slide 35 downwardly against the tension of the spring 38, said spring normally acting to hold the member 66 in engagement with the inclined edge 67 of the wedge.

I provide a counter 78 secured to the spider 55 with three counting wheels therein, which may be set to indicate the number of revolutions to propel the ship one mile which may at any time be ordered. As such revolutions seldom exceed three figures, I have only provided three index wheels, but of course a greater number may be provided if desired. To actuate or set the wheels of the counter 78, I affix a gear 79 on the shaft 70 in position to mesh with a gear of equal diameter 80 on the axle which turns the index wheel of the counter 78. Manipulation of the thumb key 77 acts to set the counter 78 and to move the wedge members 67 and force the disk 47 radially across the face of the friction wheel 17. The mechanism just described is so proportioned that when the thumb key 77 is manipulated to move the wedge 67 and disk 47 as well as to set the counter 78 at 800, for example, the ratio between the friction wheel 17 and the disk 47 is such that 800 revolutions of the engine and consequently 8 steps of the index counter 20, will turn the disk 47 through one complete revolution. Adjustment of the wedge 67, disk 47, and setting of the counter 78 at 900 will so proportion the actuation of the disk 47 by the wheel 17, that 9 steps of the index wheel 20 will turn the disk 47 through a complete revolution. Each step of the wheel 20 is in response to one reciprocation of the lever 10, and its actuation thereof by the suction piston 6, it being presumed, as above explained, that an actuation of the piston 6 is made with each 100 revolutions of the propelling shaft or of the average of all the propelling shafts of the ship. It will thus be seen that by moving the disk 47 radially to and fro on the surface of the wheel 17, I am enabled to rotate the shaft 43 and consequently the indicating wheel 61 carrying the mileage indicator a regular and even distance around the dial 4 to correspond with any given speed of the propelling shafts, which revolutions per minute may also, for convenience, be indicated by the counter 78. If the engine is being driven at a speed giving 800 revolutions per mile of distance traveled, the disk 47 and wheel are adjusted proportionately, so that the indicator wheel 61 is moved a distance of one tooth for each 800 revolutions of the engine and consequently the indicator 64 carried thereby indicates a distance of one mile traveled. The indicator hand 54, however, actuated by the beveled gears 51 and 52, makes a complete revolution for each 800 revolutions of the engine, or each 8 reciprocations of the piston 6, and consequently shows a complete revolution for each mile traveled, and a small circle 81 on the dial 4 divided into tenths may be provided.

In order to facilitate the proportionate adjustment of the disk 47 across the face of the wheel 17, I provide an arm 82 adapted to bear upon the collar 19 on the end of the shaft 16 and move the same against the tension of the spring 29, thus moving the wheel 17 from contact with the disk 47. While the wheel 17 is thus held away from contact with the disk 47, the thumb key 77 can be manipulated and the desired adjustment of the disk 47, by moving the slide 35 through the bearing of the wedge member 67, as already explained, and the radial adjustment of the disk 47 with the wheel 17, can be secured. In order to lock the carrier 69 also and to prevent tampering therewith, when the mechanism is adjusted to the desided ratio, I provide an arm 83 having a finger 84 adapted to mesh with one of the teeth in the gear 79. Preferably the arms 82 and 83 are arranged to be moved simultaneously, it being desired to release the locking action of the arm 83 and to cause the arm 82 to press the wheel 17 from the disk 47 at the same time. Therefore I have shown the arm 83 (Fig. 7) with a flange secured to one end of the arm 82 by a screw 85. Preferably these arms are operated by a pin 86 working in a groove or slot in the arm 83, which pin is carried on a crank 87 secured to the barrel of an ordinary lock 88, and actuated by a key 89. This same key and lock may be utilized to lock the cover 3 which further prevents any possible tampering with the mechanism when it is once set and adjusted as ordered. Preferably I so arrange the crank 87 and pin 86 that when the arms 82 and 83 are locked as shown in Fig. 6, the key 89 may not be removed, but can only be removed when the levers are returned to the position shown in Fig. 7, and the finger 84 has locked with the gear 79. The arm 83 will preferably act as a carrier for the shorter arm 82, said arm 83 being pivoted to the back 1 at 90.

The cover 3 is preferably equipped with a glass 91 as is usual and said glass is provided with a central aperture having a cover 92 thereon which may be swung aside in order to rotate the hand 65 (by inserting a key or the like) which is frictionally engaged only with the stud 63 carried by the indicator gear 61. This hand 65 may be employed as a "course" hand and it may be set at any desired point to run off a given length or course, while the main indicator 64 is rigidly attached to its stud in the sleeve 63. For example, should the navigating officer wish to steer in a certain direction for a given number of miles, say sixty-five, he can swing aside the cover 92, and insert the key, through the hole in the glass, into the square socket in the course hand and set the same back to zero, without disturbing the main hand 64. He proceeds on his course and when the "course" hand indicates the desired distance of sixty-five miles has been traveled, he can reset the course hand to zero and commence again on another direction of his course. By accurately noting the time elapsing between each actuation of the moving parts of the instrument, which is once for each 100 average revolutions of the engines, the navigator can quickly compute the number of revolutions per hour the ship is going through the water. In order to insure the even and steady rotation of the shaft 16 and wheel 17, as well as to prevent the same from turning in a reverse direction, a spring 93, preferably secured to the drum supporting the index wheels, is arranged concentrically of the shaft 15, which exerts the spring tension in any suitable manner, as illustrated in Fig. 4; a spring tension also is secured as shown at 94, on the screw 76. It is very desirable that the navigator should know at all times in which direction the engines are turning. Rotation of the engines in a forward direction may be connected in any suitable manner to create a vacuum in the connecting tube 7 to actuate the mechanism of the instrument in a normal manner. Reversal of the direction of rotation of the engines is made to force air up through the tube 7 and cause a pressure. I have therefore provided a valve 95 and a whistle 96 which will remain inoperative when the tube is evacuated, but will operate and give a warning signal when the engines are reversing and the tube 7 is filled with compressed air.

The advantages incident to producing automatically and in a visual manner, free from inaccuracies, and free from the errors of calculation, the actual distance traveled by a ship are of great importance. The advantage also of such automatic distance indicating means, as an aid to navigation in thick or foggy weather, and which is constantly before the navigator on the bridge in a conveniently accessible form and position is also of exceptional value. During a naval conflict, when a knowledge of the distance traveled is of the utmost importance, and when there is no time for the reading of a log at one end of the ship and the transferring of such information to the pilot house, as well as no opportunity or time for manual calculations to determine distances, the advantages of having an automatic distance indicator constantly on view will be readily appreciated. I believe that the provision of means to indicate automatically the distance traveled through the water by a vessel, by direct actuation from the propelling shafts, which means is readily adjustable for all purposes, is a distinct novelty in this art, and that I am entitled to claim the same broadly, except in so far as already shown in my said prior application.

It should be noted that the adjustment of the apparatus to secure proper proportional actuation at different speeds, and hence at different numbers of revolutions per mile, can be effected almost instantly, so that there is no appreciable error in the indication of the hands 64 and 65. This is a very decided advantage.

Having described my invention, what I claim as new and desire to secure by Letters Patent is:

1. An automatic distance indicator for vessels propelled by power, comprising means to indicate distance traveled, an indicator therefor, actuating mechanism for said indicator operated solely by the power propelling the vessel, said actuating mechanism including a friction wheel responsive to the power propelling means, in combination with means to disconnect said friction wheel from the indicator actuating mechanism, and means to adjust the operative relation of the indicator actuating mechanism with said wheel while disconnected.

2. An automatic distance indicator for vessels propelled by power, comprising means to indicate distance traveled, including an indicator, and actuating mechanism therefor operated by the power propelling the vessel independently of exterior travel affecting conditions, means to adjust the indicator actuating mechanism to correspond with predetermined actuations of the propelling mechanism, including a counter to show automatically the selective number of engine actuations the mechanism is adapted to register.

3. An automatic distance indicator for vessels propelled by power, comprising means to indicate distance traveled, including an indicator therefor, actuating mechanism for said indicator operated solely by the power propelling the vessel, adjustable means to vary said actuating mechanism, and means to disconnect a part of said actuating mechanism for the purpose of effecting said adjustment during such disconnection.

4. An automatic distance indicator for vessels propelled by power, comprising means to indicate distance traveled, including an indicator, and actuating mechanism therefor operated by the power propelling the vessel, and means to adjust the indicator actuating mechanism for varying actuations of said power propelling mechanism, said means including a movable wedge member, a threaded screw actuating same, a slide engaging said wedge member and actuated thereby to change the actuation of said wedge on the indicator operating mechanism during longitudinal adjustment of said member.

5. An automatic distance indicator for vessels propelled by power, comprising means to indicate distance traveled, including an indicator, and actuating mechanism therefor including fluid transmission operated by the power propelling the vessel, said means comprising mechanism connected with the propelling power to actuate the distance indicator in a predetermined direction of movement of said power, in combination with means to prevent the actuation of said indicator during a reversal of movement of the propelling power by means permitting the escape of the transmitting fluid.

6. An automatic indicator for vessels, propelled by power, comprising means to indicate distance traveled, including an indicator and actuating mechanism therefor, operated by the propelling power of the vessel, and means to vary said indicator actuating mechanism, comprising a slide carrying a driving element of said mechanism, and means simultaneously to show the extent of adjustment.

In testimony whereof, I have signed my name to this specification, in the presence of two subscribing witnesses.

HENRY H. CUMMINGS.

Witnesses:
JAMES R. HODDER,
R. G. HERSEY.

Copies of this patent may be obtained for five cents each, by addressing the "Commissioner of Patents, Washington, D. C."